(12) United States Patent
Balfanz et al.

(10) Patent No.: US 8,156,337 B2
(45) Date of Patent: Apr. 10, 2012

(54) SYSTEMS AND METHODS FOR AUTHENTICATING COMMUNICATIONS IN A NETWORK MEDIUM

(75) Inventors: Dirk Balfanz, Menlo Park, CA (US); Cristina Lopes, San Francisco, CA (US); Diana Smetters, Burlingame, CA (US); Paul Stewart, Sunnyvale, CA (US); Hao-Chi Wong, San Carlos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1532 days.

(21) Appl. No.: 11/395,274

(22) Filed: Apr. 3, 2006

(65) Prior Publication Data

US 2006/0174116 A1 Aug. 3, 2006

Related U.S. Application Data

(63) Continuation of application No. 10/066,699, filed on Feb. 6, 2002, now abandoned.

(51) Int. Cl.
H04L 9/32 (2006.01)
(52) U.S. Cl. ......... 713/169; 713/168; 713/170; 713/175
(58) Field of Classification Search .................. 713/168, 713/169, 170, 175
See application file for complete search history.

(56) References Cited

U.S. PATENT DOCUMENTS

| 5,091,942 | A | 2/1992 | Dent |
| 5,341,426 | A | 8/1994 | Barney et al. |
| 5,408,250 | A | 4/1995 | Bier |
| 5,519,778 | A | 5/1996 | Leighton et al. |
| 5,539,824 | A | 7/1996 | Bjorklund et al. |
| 5,598,459 | A | 1/1997 | Haartsen |
| 6,064,741 | A | 5/2000 | Horn et al. |
| 6,075,860 | A | 6/2000 | Ketcham |

(Continued)

FOREIGN PATENT DOCUMENTS

EP 1024626 A1 1/1999

(Continued)

OTHER PUBLICATIONS

Balfanz, Smetters, Stewart, and Wong. Talking to Strangers: Authentication in Ad-Hoc Wireless Networks. Mar. 11, 2002. http://www2.parc.com/csl/members/smetters/publications/loclim.pdf.*

(Continued)

*Primary Examiner* — Eleni Shiferaw
*Assistant Examiner* — Tamara Teslovich
(74) *Attorney, Agent, or Firm* — Shun Yao; Park, Vaughan, Fleming & Dowler LLP

(57) ABSTRACT

Pre-authentication information of devices is used to securely authenticate arbitrary peer-to-peer ad-hoc interactions. In one embodiment, public key cryptography is used in the main wireless link with location-limited channels being initially used to pre-authenticate devices. Use of public keys in the pre-authentication data allows for the broadening of types of media suitable for use as location-limited channels to include, for example, audio and infrared. Also, it allows a range of key exchange protocols which can be authenticated in this manner to include most public-key-based protocols. As a result, a large range of devices, protocols can be used in various applications. Further, an eavesdropper is forced to mount an active attack on the location-limited channel itself in order to access an ad-hoc exchange. However, this results in the discovery of the eavesdropper.

20 Claims, 10 Drawing Sheets

U.S. PATENT DOCUMENTS

| | | | |
|---|---|---|---|
| 6,105,133 | A | 8/2000 | Fielder et al. |
| 6,243,373 | B1 | 6/2001 | Turock |
| 6,243,772 | B1 | 6/2001 | Ghori et al. |
| 6,366,654 | B1 | 4/2002 | Cramer et al. |
| 6,396,612 | B1 | 5/2002 | Bjorndahl |
| 6,901,241 | B2 | 5/2005 | Bjorndahl |
| 7,027,836 | B2 | 4/2006 | Zacks et al. |
| 7,581,096 | B2 * | 8/2009 | Balfanz et al. ............... 713/168 |
| 2001/0048744 | A1 | 12/2001 | Kimura |
| 2002/0022483 | A1 | 2/2002 | Thompson et al. |
| 2002/0061748 | A1 | 5/2002 | Nakakita et al. |
| 2002/0065065 | A1 | 5/2002 | Lunsford et al. |
| 2002/0094087 | A1 | 7/2002 | Dellmo et al. |
| 2002/0147920 | A1 | 10/2002 | Mauro |
| 2002/0159598 | A1 | 10/2002 | Rubinstein et al. |
| 2002/0176579 | A1 | 11/2002 | Deshpande et al. |
| 2003/0014646 | A1 | 1/2003 | Buddhikot et al. |
| 2003/0051140 | A1 | 3/2003 | Buddhikot et al. |
| 2003/0078072 | A1 | 4/2003 | Serceki et al. |
| 2003/0081774 | A1 | 5/2003 | Lin et al. |
| 2003/0095663 | A1 | 5/2003 | Nelson et al. |
| 2003/0117985 | A1 | 6/2003 | Fujii et al. |
| 2003/0149874 | A1 | 8/2003 | Balfanz et al. |
| 2004/0030887 | A1 | 2/2004 | Harrisville-Wolff et al. |
| 2004/0054899 | A1 | 3/2004 | Balfanz et al. |
| 2004/0088548 | A1 | 5/2004 | Smetters et al. |
| 2004/0103280 | A1 | 5/2004 | Balfanz et al. |
| 2004/0215974 | A1 | 10/2004 | Conley et al. |
| 2004/0266449 | A1 | 12/2004 | Smetters et al. |
| 2004/0268119 | A1 | 12/2004 | Smetters et al. |

FOREIGN PATENT DOCUMENTS

| | | |
|---|---|---|
| WO | WO 99/41876 | 8/1999 |

OTHER PUBLICATIONS

McDaniel, Patrick, Atul Prakash and Peter Honeyman. Antigone: A Flexible Framework for Secure Group Communication. May 23, 1999.

Balfanz et al. "Talking to Strangers: Authentication in Ad-Hoc Wireless Networks," http://www.isoc.org/isoc/conferences/ndss/02/proceedings/papers/balfan.pdf, pp. 1-13, posted on Internet Feb. 11, 2002.

Dridi et al., "How to Implement Web-based Groupware Systems based on WebDAV," *Proc. of WETICE 99, IEEE 8th Intl. Workshops on Enabling Technologies: Infrastructure for Collaborative Enterprises*, pp. 1-7, Stanford, CT, Jun. 1999.

Bardram, J. et al. "Context-Aware User Authentication-Supporting Proximity-Based Login in Pervasive Computing," .K. Deys et al., (EDS.): UbiComp 2003, LNCS 2864, pp. 107-123, 2003.

U.S. Appl. No. 60/480,909, filed Jun. 2003, Smetters et al.

Fielding, R. et al., "Web-Based Development of Complex Information Products," *Communications of the ACM*, vol. 41, No. 8, pp. 84-92, 1998.

Kindberg, T. et al., "Secure Spontaneous Device Association," *A.K. Deys et al., (Eds.) UbiComp 2003, LNCS 2864*, pp. 124-131, 2003.

Kindber, T., et al., "Validating and Securing Spontaneous Associations between Wireless Devices," *HP Laboratories*, Palo Alto, HPL-2002-256, Hewlett-Packard Company, Sep. 12, 2002.

Lopes, D. et al., "Aerial Acoustic Communication," *IEEE Workshop on Applications of Signal Processing to Audio and Acoustics*, pp. 21-24, 2001.

Whitehead, Jr. et al., "WebDAV, A Network Protocol for Remote Collaborative Authoring on the Web," http://citeseer.nj.nec.com/whitehead99webday.html, posted Mar. 11, 2003, pp. 1-21, 1999.

Whitehead, Jr., et al. "Lessons from WebDAV for the Next General Web Infrastructure," http://www.ics.uci.edu/~eju/http-future/Whitehead/http_pos_paper.html, posted Sep. 20, 2002.

Geer, Daniel E. et al. "Token-Mediated Certification and Electronic Commerce", Proceedings of the Second USENIX Workshop on Electronic Commerce, Oakland, California, Nov. 1996.

"ACC: Automatic Cryptographic Configuration of Embedded Devices" XML Trust Center White Paper 19th Feb. 2002, http://research.verisign.com/Papers/ACC1.html.

Asokan N et al.: "Key agreement in ad hoc networks", Computer Communications, Elsevier Science Publishers BV, Amsterdam, NL, vol. 23, No. 17, Nov. 1, 2000, pp. 1627-1637.

F. Stajano and R. Anderson: "The Resurrecting Duckling: Security Issues for Ad-hoc Wireless Networks" 1999, AT&T Software Symposium, 'Online!' Sep. 15, 1999.

Bruce Schneier: "Applied Cryptography: Protocols, Algorithms, and Source Code in C" 1996, John Wiley & Sons, New York, US, Section 8.3 "Transferring Keys".

The Resurrecting Duckling: Security Issue for Ad-hoc Wireless Networks; 7th International Workshop on Security Protocols; Cambridge, UK; Apr. 20, 1999.

* cited by examiner

SYSTEMS AND METHODS FOR AUTHENTICATING COMMUNICATIONS IN A NETWORK MEDIUM

This is a Continuation of application Ser. No. 10/066,699 filed Feb. 6, 2002. The disclosure of the prior application is hereby incorporated by reference herein in its entirety.

BACKGROUND

1. Field of Invention

This invention relates to systems and methods for authenticating a communication between at least two devices that is transmitted using a network medium.

2. Background of the Related Art

Developments in network communications have enabled users to receive information, such as documents, over the network medium. The network medium includes wired networks and wireless networks. Information transmitted over the network medium may be accessible to others. However, users typically desire that such information received not be available to others.

FIG. 1 illustrates an example where a user 110 is in a public place that is accessible to others. The user 110 wants to print a sensitive document that the user 110 just received on the user's wireless device 112. As shown in FIG. 1, the user 110 may have access to a number of printers 122, 124, 126 or 128 with wireless capabilities by various companies, some of which may be familiar to the user 110 and some which may not be familiar. The user 110 wants to choose a particular printer such as, for example, a first printer 122, and further wants to ensure that the user's wireless device 112 prints to that first printer 122 and to no other printers 124, 126, 128 or any other device. Additionally, the user 110 wants to ensure that no other person 130 within the wireless transmission range of the wireless device 112, can learn the contents of the sensitive document.

To do this, the user 110 needs to let the wireless device 112 know how to find the first printer 122 over a wireless medium, such as a wireless network. Conventionally, there are few options user 110 may use to find the first printer 122. Assuming each printer has a unique name, the user 110 may type the name of the first printer 122 into the user's wireless device 112. Alternatively, the user 110 may have access to a discovery protocol, where the user 110 may pick the first printer 122 out of a list of printers. But the wireless device 112 should guarantee that it is actually talking to the first printer 122 and that the communication is secure.

One method of bootstrapping trust in the specific context of ad-hoc wireless networks is available in various known wireless protocols. One system, commercially available under the Bluetooth trade name, in its most secure configuration, requires users to enter a random personal identification number (PIN) into each wireless device that is to participate in communication, placing the burden of establishing shared secrets on the user. In addition, Bluetooth has been subject to security breaches. Wired Equivalent Privacy (WEP), the link-layer security protocol for ANSI/IEEE 802.11, also has usability issues. It requires a group of communicating wireless devices to be initialized with the same key, usually derived from a password. WEP too has been subject to security breaches.

Another method may be to use an out-of-band mechanism for establishing security. Frank Stajano et al., "Resurrecting Duckling: Security Issues for Ad-hoc Wireless Networks," 7$^{th}$ International Workshop, Lecture Notes in Computer Science, Cambridge, United Kingdom, April 1999, Springer-Verlag, Berlin, Germany, describes a security model usable to regulate secure transient association between devices in ad-hoc wireless networks. In the model, a "mother-duckling" relationship between two devices is set up when the "mother" device establishes a shared secret with the "duckling" device through a physical contact. The shared secret enables the "duckling" device to recognize the "mother" device and be controlled by the "mother" device in future interactions. The "mother" device may upload an access-control policy into the "duckling" device, which determines the type of relationships that the "duckling" device may have with various other devices. More importantly, the shared secret allows the "mother" and "duckling" devices to securely communicate.

FIG. 2 illustrates one exemplary embodiment where several users 221, 223, 225, and 227 with wireless devices 201, 203, 205 and 207, such as a laptop computer with wireless capabilities, are located within a locality, such as a conference room at a conference center. The users 221, 223, 225 and 227 desire to exchange various sensitive documents among themselves using the wireless devices 201, 203, 205 and 207. However, among the many problems associated with this approach is that the radio frequencies in which the wireless devices operate penetrate the conference room walls. As a result the sensitive documents are subject to capture by potential eavesdroppers 222, 224 and 226 lurking in the corridors or the next conference room.

SUMMARY OF THE INVENTION

This invention provides systems and methods that allow a communication between a plurality of devices to be secured.

This invention separately provides systems and methods for authenticating wireless communications between a plurality of devices.

This invention separately provides systems and methods that allow pre-authentication information to be transmitted between a plurality of devices.

This invention further provides systems and methods that are location-limited communication channels to transmit the pre-authentication information between the plurality of devices.

In various exemplary embodiments, a first device sends pre-authentication information to a second device over a location-limited channel. In various exemplary embodiments, a second device responds by sending its pre-authentication information to the first device over the location-limited channel.

In various exemplary embodiments, the pre-authentication information includes sending one or more of a public key, digest of an authenticator, such as a public key, a secret or the like. In various exemplary embodiments, the location-limited channel includes one or more channels such as an infra-red channel, an audio channel and the like.

In various exemplary embodiments, at least one device is designated as a group manager. In various exemplary embodiments, the group manager uses a location-limited channel to exchange pre-authentication information with the remaining devices in the group. In various exemplary embodiments, the group manager and the remaining devices authenticate communication over a network medium using exchanged pre-authentication information.

In various embodiments, the pre-authentication information includes a commitment to a secret sent by the first device to the second device, along with a commitment to its first, meaningful, message. The second device reciprocates by sending a commitment to its secret, along with a commitment to its first, meaningless, message to the first device. Each device in turn then acknowledges the message received from the other device over the location-limited channel. The devices continue to communicate over the wireless link in this fashion, producing an exchange of messages from the legitimate sender that is secure.

In various exemplary embodiments, communication over the network medium is secured between a group of devices. At least one device is designated as a group manager. The group manager uses a location-limited channel to exchange pre-authentication information between the group manager and the remaining devices in the group. The group manager and the devices in the group authenticates communication over the network medium using the exchanged pre-authentication information.

In various exemplary embodiments, communication over the network medium is secured among a group of devices. Each device exchanges pre-authentication information with one or more other devices in the group. A communicating device uses the exchanged pre-authentication to authenticate a communication over the network medium with one or more selected devices.

These and other features and advantages of the invention are described in, or are apparent from, the following detailed description of various exemplary embodiments of the systems and methods according to this invention.

BRIEF DESCRIPTION OF THE DRAWINGS

Various exemplary embodiments of the invention are described in detail, with reference to the following figures, wherein.

DETAILED DESCRIPTION OF EXEMPLARY EMBODIMENTS

In various exemplary embodiments of systems and methods according to this invention, pre-authenticating a number of wireless devices is used to securely authenticate arbitrary peer-to-peer ad-hoc interactions. This may also include a bootstrap to a key exchange protocol that is used to set up an encrypted channel. In one exemplary embodiment, a public key is committed to on the pre-authentication channel. A key exchange protocol using public key cryptography is used in the main wireless link to establish secure communications. Due to pre-authenticating the wireless devices using public keys, the types of media usable as location-limited channels do not need to be immune to eavesdropping and can include, for example, audio and/or infra-red channels. In various embodiments, pre-authenticating the wireless devices using public keys allows a range of public-key-base key exchange protocols which can authenticate wireless devices to be used. As a result, a large range of location-limited channel types, devices and protocols can be used in various applications. Further, an eavesdropper is forced to mount an active attack on the location-limited channel itself in order to access the ad-hoc exchange, wired network or wireless network, as opposed to a passive attack, such as eavesdropping, on the location-limited channel or active or a passive attack on the wireless channel. However, this usually, if not always, results in the discovery of the eavesdropper.

Figure 1:
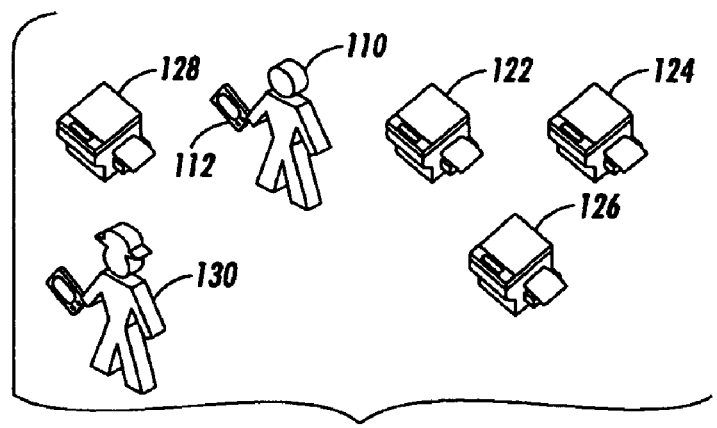
FIG. 1 illustrates one exemplary situation in which the systems and methods according to this invention may be used.
Figure 2:
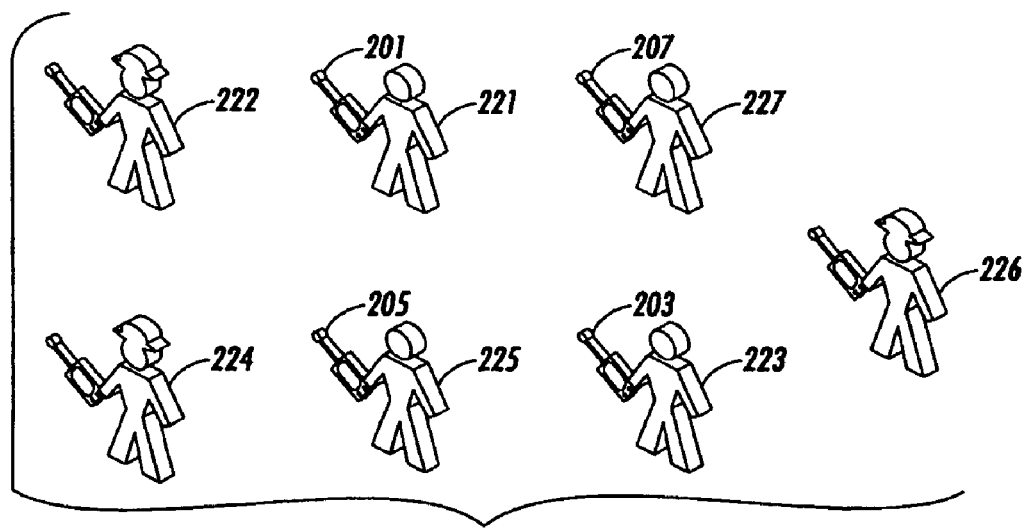
FIG. 2 illustrates a second exemplary situation in which the systems and methods according to this invention may be used.
Figure 3:
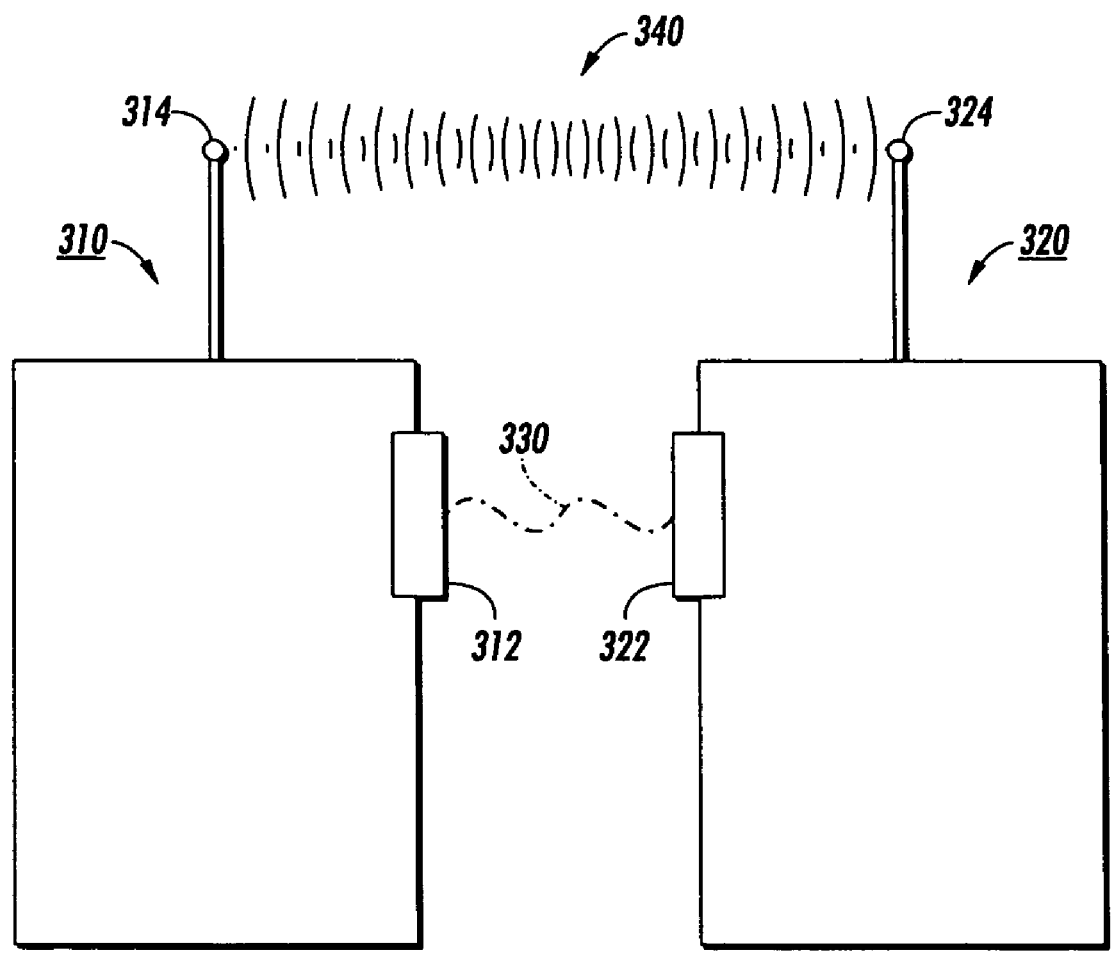
FIG. 3 illustrates one exemplary embodiment of a communication authenticating system according to this invention.

FIG. 3 illustrates one exemplary embodiment of a wireless system 300 that authenticates communication in a network medium, such as an ad-hoc wireless network. To aid in the understanding of the invention, only two wireless devices 310 and 320 are shown. However, the system 300 is capable of including more than two wireless devices in the arbitrary, ad-hoc wireless network to be established between the wireless devices. The first wireless device 310 includes a location-limited channel receiver/transmitter 312 and a main wireless link receiver/transmitter 314. Likewise, the second wireless device 320 includes a location-limited channel receiver/transmitter 322 and a main wireless link receiver/transmitter 324. In an alternative embodiment, the first and second wireless devices each has a main wired link receiver/transmitter, such as Transport Control Protocol/Internet Protocol (TCP/IP) sockets or any other known or later developed wired network receivers/transmitter. In another embodiment, the first and second wireless devices have both a main wireless link and a main wired link.

If the first wireless device 310 initiate communication with the second wireless device 320, the first wireless device 310 initially sends pre-authentication information through the location-limited channel receiver/transmitter 312 to the second wireless device 320 via the location-limited channel 330. The second wireless device 320 receives the pre-authentication information from the first wireless device 310 through the location-limited channel receiver/transmitter 322.

In various embodiments, where mutual authentication is not required, for example, where the second wireless device 320 is a wireless printer that services any request, the first wireless device 310 does not need to send pre-authentication information to the second wireless device 320. A wireless device that does not mutually exchange pre-authentication information with another wireless device cannot authenticate the communication received from the other wireless device. Thus, that wireless device is unprotected against attacks by an eavesdropper. Thus, where mutual authentication is required, such as an exchange of sensitive information between two wireless devices, such as between two laptop computers, the second wireless device 320 responds by sending additional pre-authentication information through the location-limited channel receiver/transmitter 322 to the wireless device 310 via the location-limited channel 330.

The first wireless device 310 receives the pre-authentication information through its location-limited channel receiver/transmitter 312. With the pre-authentication information exchanged between the first and second wireless device 310 and 320, the first wireless device 310 uses the main wireless link receiver/transmitter 314 to communicate with the second wireless device 320 via the main wireless link 340. The second wireless device 320 uses its main wireless link receiver/transmitter 324 to communicate with the first wireless device 310 via the main wireless link 340. Because pre-authentication information has been exchanged between the two wireless devices 310 and 320 in both directions, each of the first and second wireless devices 310 and 320 authenticates the communication of the other wireless device 320 and 310, respectively, using the received pre-authentication information received from that other wireless device 320 or 310, respectively.

Figure 4:
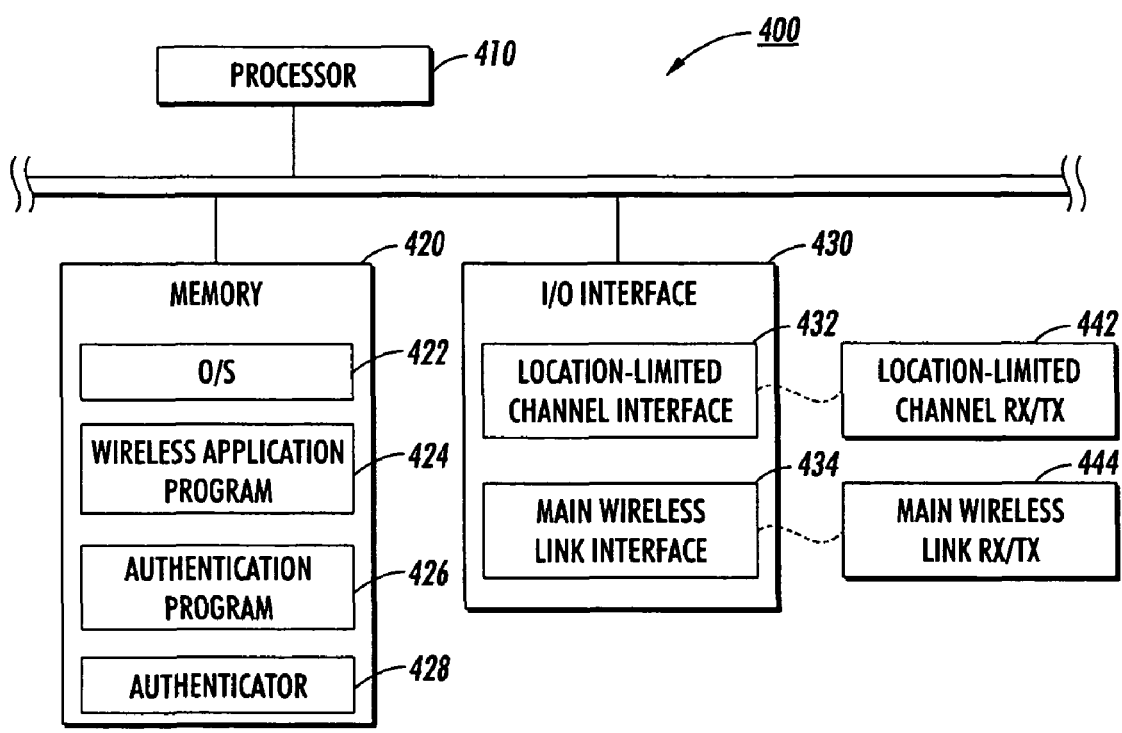
FIG. 4 illustrates one exemplary embodiment of a wireless device according to this invention.

FIG. 4 illustrates one exemplary embodiment of a wireless device 400 for authenticating communication in a network medium that is usable as either of the first or second wireless devices 310 or 320. The wireless device 400 may be a Personal Digital Assistant (PDA), a laptop computer with wireless capability, a wireless hand held computer, a Blackberry™ device, a printer with wireless capability, a wireless phone or any other known or later developed wireless-capable device. According to one exemplary embodiment, the wireless device 400 includes a processor 410, a memory 420, an input/output (I/O) interface 430, a location-limited channel receiver/transmitter 442 and a main wireless link receiver/transmitter 444. The processor 410 may be a microprocessor, a microcontroller, a digital signal processor (DSP), an arithmetic logic unit (ALU), an application specific integrated circuit (ASIC) and the like. The memory 420 may include volatile memory and/or non-volatile memory, including one or more of random access memory (RAM), read only memory (ROM), Flash memory, a soft or a hard disk drive, an optical disk drive and the like.

The memory 420 stores an operating system 422, a wireless application 424, an authentication application 426 and an authenticator 428. The operating system 422 may be a customized basic I/O system, any known or later developed commercially available operating system or the like. The operating system 422 provides the computer instructions which, when executed by the processor 410, programs and controls various I/O controllers including the I/O interface 430 of the wireless device 400. The operating system 422 also provides the computer instructions that stores the wireless application 424, the authentication application 426 and the authenticator 428 in a retrievable manner.

The wireless application 424 provides computer instructions which, when executed by the processor 410, allows the wireless device 400 to communicate with a wireless network through the main wireless link receiver/transmitter 444 connected to a main wireless link interface 434 of the I/O interface 430. The wireless application 424 may be Bluetooth™, ANSI/IEEE 802.11, or any other known or later developed wireless communication media.

The main wireless link interface 434 and the main wireless link receiver/transmitter 444 can be implemented using any known or later developed wireless communication circuit or structure. For example, a wireless receiver/transmitter and interface used in a wireless network can be used as the main wireless link interface 434 and the main wireless link receiver/transmitter 444. In an alternative embodiment, the wireless device has main wired link interface and main wireless link receiver/transmitter such as TCP/IP interface and socket or both the main wireless link interface and transmitter, and main wired interface and receiver/transmitter.

In various exemplary embodiments, the location-limited channel receiver/transmitter 442 is separate from the main wireless link receiver/transmitter 444. In various exemplary embodiments, a suitable location-limited channel receiver/transmitter 442 has at least two properties in order to send and receive pre-authentication information of the wireless devices. The first such property is a demonstrative property. A suitable location-limited channel receiver/transmitter 442 has physical limitations in its transmissions. For example, sound, whether in the audible and/or in the ultrasonic range, which has a limited transmission range and broadcast characteristics, may be used as a location-limited channel for a group of wireless devices. For point-to-point communication, such as between two wireless devices, a location-limited channel with directionality, such as an infra-red channel may be used. The demonstrative property allows for communication across a location-limited channel to "name" a target device or group of devices based on the physical relationships between the devices and the limited locations accessible through the location-limited channel.

The second property is authenticity. In contrast with the "mother-duckling" model described above that assumes the impossibility of eavesdropping, the second property only requires that the pre-authentication information be authentic. This property ensures that pre-authentication information exchanged over the location-limited channel allows the exchanging wireless devices to securely authenticate each other over the main wireless link, even in the presence of eavesdroppers. If the participants use the location-limited channel to exchange their public keys as pre-authentication information, an attack by an eavesdropper on location-limited channel does not matter because the eavesdropper does not know the participants' private keys. The participants will authenticate each other over the main wireless link by proving possession of their corresponding private keys as part of a key exchange protocol. Thus, the eavesdropper will not be able to impersonate any of the participants.

Another property of a location-limited channel receiver/transmitter is that the location-limited channel is difficult to attack without the attack being detected by at least one legitimate participant (human or device). These include a receiver/transmitter that uses infra-red, sound, whether audio and/or ultrasound, and/or near-field signaling across the body, such as that described in, for example, T. G. Zimmerman, "Personal Area Networks: Near-field intrabody communication", IBM Systems Journal, 35(3&4): p609-617, 1996, which is incorporated herein by reference in its entirety.

Detecting the attack may not require that the devices transmitting on the location-limited channel be identified. Instead, for example, detecting the attack may merely depend on one's ability to count. Thus, if two wireless devices are attempting to communicate, and the communication is successful, as indicated, for example, by the lights on the target device blinking, or by the human that is using a laptop computer indicating that the communication was successful, then the number of legitimate participants are known. If extra, illegitimate, participants are detected, for example, by the laptop indicating that a third participant has joined the communication, the communication may simply be aborted by the legitimate participants.

The pre-authentication information is used to authenticate the received authenticator 428. The authenticator 428 may be a key, a secret, or the like. The key may be either a long-lived key or an ephemeral key. An ephemeral key is created afresh for each new session or during a session. The choice is usually based on the application in which the key is being used. In either case, the key does not require certification by a trusted authority. However, if the key exchange protocol chosen requires an exchange of certificates, the certificate may be self-signed by the wireless device 400.

Usually, the amount of information exchanged across the location-limited channel is a small fraction of the amount of information sent across the main wireless link because the location-limited channel usually has limited data rate. One method of reducing the size of the pre-authentication information is to use cryptographically-secure hash functions, such as, for example, Secure Hash Algorithm-1 (SHA-1), which may be part of the authentication application 426. Using this method, the participants need not actually exchange their complete public keys as pre-authentication information. Instead the participants send commitments of the keys, for example, by exchanging digests of the keys. The participants exchange commitments to their public keys across a chosen location-limited channel. In doing so, each participant is able to identify whom that participant is communicating with.

The wireless device 400 communicates with another wireless device using the main wireless link receiver/transmitter 444. The wireless device 400 uses the authentication application 426, which may include various established public-key-based key exchange protocol, such as the commercially available Secure Socket Layer/Transport Layer Security (SSL/TLS), Secure Key Exchange Mechanism (SKEME), Internet Key Exchange (IKE) or any other known or later developed public-key based exchange protocol, to prove possession of the private key, which corresponds to the public key committed during the pre-authentication information exchange. In the case, where a digest of the public key was sent during the pre-authentication information exchange, the wireless device 400 exchanges the complete public key over the main wireless link. The key exchange may either be prefixed to protocol execution, or, as in Socket Layer/Transport Layer Security (SSL/TLS), occurs naturally as a standard part of the key exchange protocol. The keys are authenticated by the fact that they were the ones committed to across the location-limited channel. The wireless device 400, having authenticated the other wireless device's public keys, proceed with the exchange protocol on the main wireless link.

Figure 5:
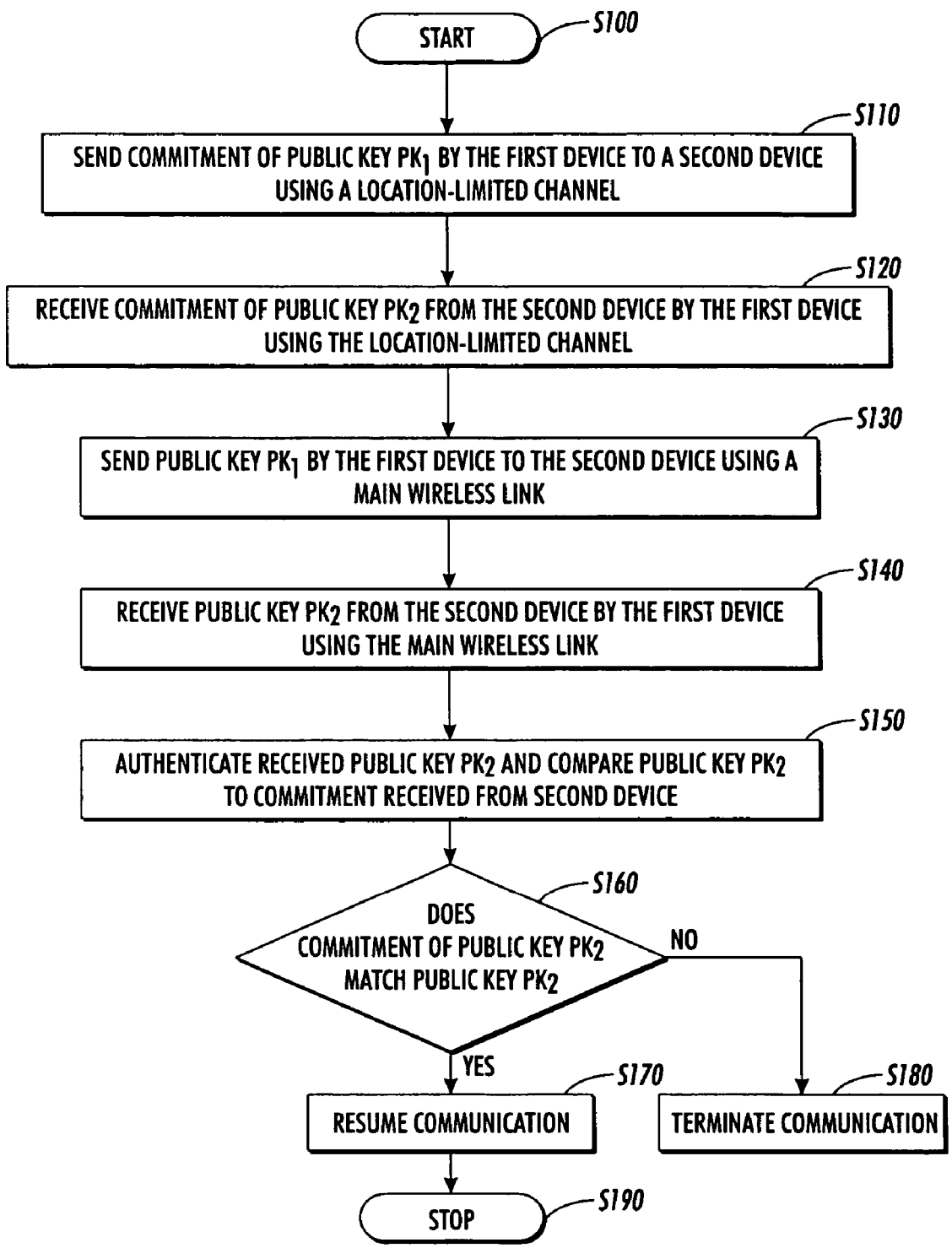
FIG. 5 is a flowchart outlining a first exemplary embodiment of a method for authenticating communication over a wireless medium according to this invention.

FIG. 5 is a flowchart outlining one exemplary embodiment of a method for authenticating a communication over a network medium between a first wireless device and a second wireless device. The first wireless device contains a first public key $PK_1$. The second wireless device contains a second public key $PK_2$. Beginning in step S100, operation continues to step S110, where first wireless device sends a commitment to the public key $PK_1$ using a location-limited channel to a second wireless device. This is at least a part of the exchange of pre-authentication information over the location-limited channel. The commitment can be the public key itself, a certificate, or a digest of the public key. Then, on step S120, in response to receiving the commitment to the public key $PK_1$ from the first wireless device, the second wireless device sends a commitment to the public key $PK_2$ over the location-limited channel, which is received by the first wireless device. At this stage, the first wireless device may also receive the address of the second wireless device to provide for communication over the main wireless link. It should be appreciated that additional amounts or rounds of information exchange over the location limited channel can be performed if desired. Operation then continues to step S130.

In step S130, the first wireless device sends the public key $PK_1$ to the second wireless device using the wireless main link. Next, in step S140, the second wireless device sends its public key $PK_2$ to the first wireless device and the exchange of keys take place. Then, in step S150, the first wireless device authenticates the public key $PK_2$ received from the second wireless device and compares the public key $PK_2$ against the commitment received in the pre-authentication information stage. In one embodiment, the authentication of the received public key $PK_2$ is performed using a key exchange protocol, such as those illustrated in FIG. 4, that proves ownership of a private key corresponding to the public key. In the event that the second wireless device is using a secret $S_2$ when the first wireless device sends its public key $PK_1$ across the wireless main link the second wireless device verifies the public key $PK_1$ against the commitment, and uses it to encrypt its secret $S_2$ and returns the result $EPK_1(S_2)$ to the first wireless device. Authentication is performed by the second wireless device's ability to produce the secret $S_2$, and the first wireless device's ability to decrypt the result $EPK_1(S_2)$. Operation then continues to step S160.

In step S160, a determination is made whether the commitment for the public key $PK_2$ previously received from the second wireless device matches the received public key $PK_2$. If so, operation continues to step S170. Otherwise, operation jumps to step S180. In step S170, the first wireless device resumes communication with the second wireless device over the main wireless link using the symmetric key agreed upon during the key exchange protocol to encrypt the communication. Operation then jumps to step S190. In contrast, in step S180, if the first wireless device cannot authenticate the public key $PK_2$ of the second wireless device the first wireless device terminates the communication with the second wireless device. Operation then continues to step S190, where the method ends.

It should be appreciated that in various exemplary embodiments, the first wireless device includes an arbitrary secret $S_1$, such as a random number. In this case, because the first wireless device is sending a commitment to the arbitrary secret $S_1$, the commitment is sent in a form of a cryptographic digest $h(S_1)$ because $S_1$ is to remain a secret. In various other exemplary embodiments, the first wireless device may also transmit its address, such as an IP address and port number, a Bluetooth device address, a user-friendly name or any other appropriate information to provide for communication at the main wireless link.

Figure 6:
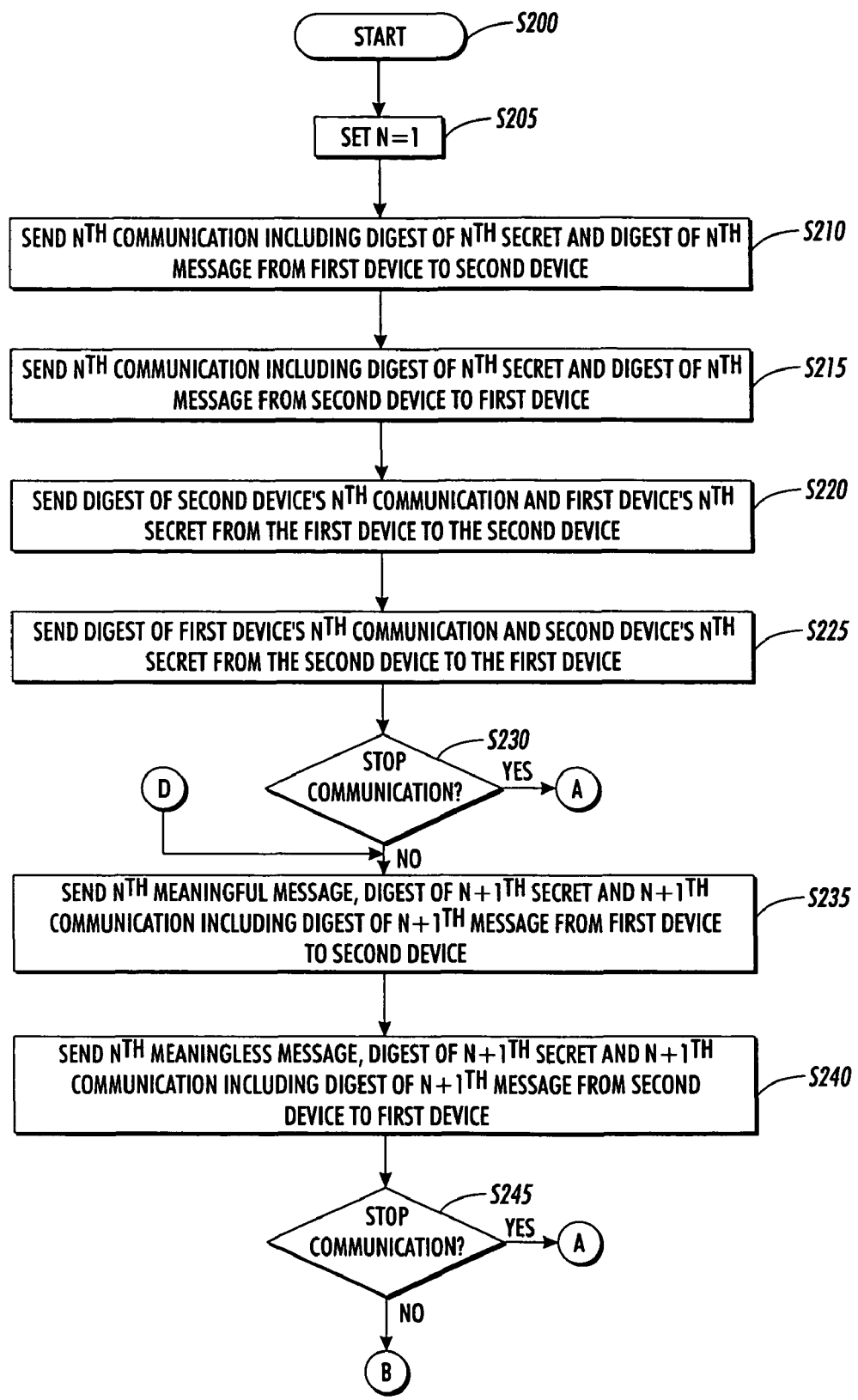
FIGS. 6-8 are flowcharts outlining a second exemplary embodiment of a method for authenticating communication over a wireless medium according to this invention.
Figure 7:
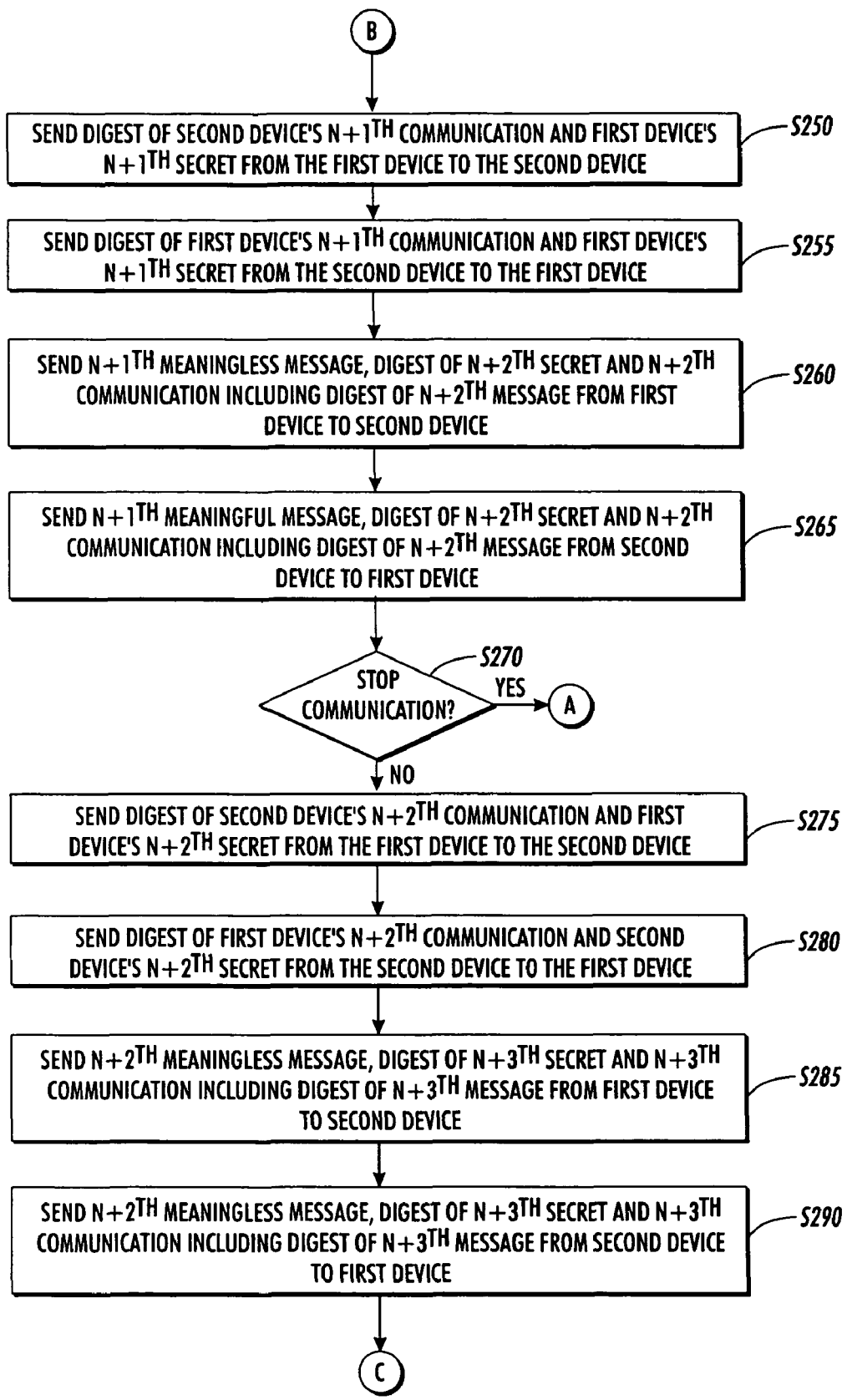
Figure 8:
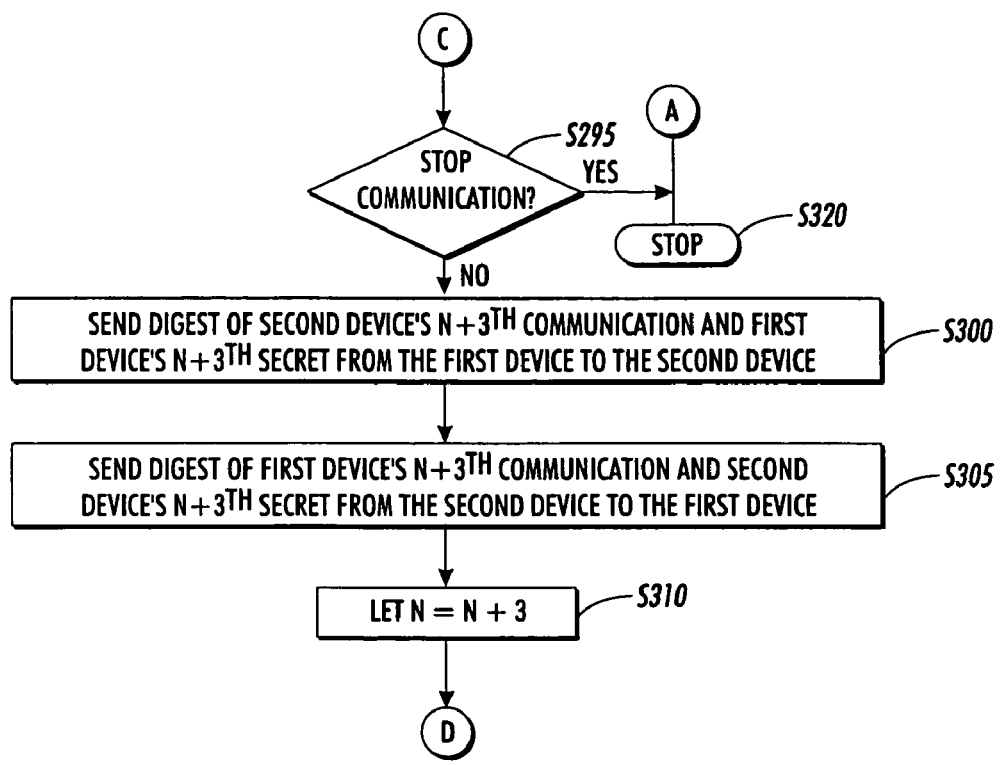

FIGS. 6-8 are flowcharts outlining one exemplary embodiment of a method that complements an improved Guy Fawkes protocol that provides for interactive communication. This method may be used where the wireless devices have limited computational resources, such that public key operations are infeasible, and the location-limited channel does not provide a trusted exchange of secret data.

An example of a conventional Guy Fawkes protocol is described in Anderson et al., "A New Family of Authentication Protocols", ACMOSR: ACM Operating Systems Review, 32, 1998. Initially designed for authenticating digital streams the Guy Fawkes protocol assumes that parties A and B want to exchange streams, comprising sequential blocks $A_0, A_1, A_2, \ldots$ and $B_0, B_1, B_2, \ldots$ respectively. At each step i, A sends to B a packet $P_i$ containing 4 pieces of data: a block $A_i$; a random value $X_i$, used as an authenticator for the block $A_i$; the digest $X_{i+1}h(X_i+1)$ of the next authenticator; and the $n(a_i+1)$ digest of the message $a_{i+1}$="$(A_{i+1}, h(X_{i+2}), X_{i+1})$". B does the same during that step i. Assuming that B received an authenticated packet P. B authenticates the packet Pi as soon as B receives it, because the packet Pi contained the digest $n(a_{i+1})$. It should be appreciated that this does not hold if A and B do not execute in lock-step. Thus, this protocol requires both A and B to know, one step ahead of time, what they want to say next, which makes the protocol unsuitable for interactive exchanges.

As shown in FIGS. 6-8, in accordance with the improved Guy Fawkes protocol, according to this invention, operation begins in step S200 and continues to step S205, where a counter N is set to 1. Then, in step S210, a first wireless device sends an $N^{th}$ communication that includes a digest of its $N^{th}$ secret (authenticator) that will be used to authenticate its $N^{th}$ message together with a digest of its $N^{th}$ message over a location-limited channel to a second wireless device. Next, in step S215, the second wireless device sends an $N^{th}$ communication that includes a digest of its $N^{th}$ secret that will be used to authenticate its $N^{th}$ message together with a digest of its $N^{th}$ message over the location-limited channel to the first wireless device. Operation then continues to step S220.

In step S220 the first wireless device sends a digest of the $N^{th}$ communication of the second wireless device and the first wireless device's $N^{th}$ secret to the second wireless device. Next, in step 225, the second wireless device sends a digest of the $N^{th}$ communication of the first wireless device and the second device's $N^{th}$ secret to the first wireless device. Then, in step S230, a determination is made by one or both of the first and second wireless devices whether to terminate the communication. If either of the first wireless device or the second wireless device determines to terminate the communication, operation proceeds to step S320. Otherwise, the communication continues and operation continues to step S235.

In step S235, the first wireless device continues the communication over a main wireless link. As the initiator of the communication, the first wireless device sends an $N^{th}$ message which is meaningful, and a digest of its $(N+)^{th}$ secret that will be used to authenticate its $(N+1)^{th}$ message together with an $(N+1)^{th}$ communication that includes a digest of the $(N+1)^{th}$ message to the second wireless device. Next, in step S240, the second wireless device sends an $N^{th}$ message which is meaningful, and a digest of its $(N+1)^{th}$ secret that will be used to authenticate its $(N+1)^{th}$ message together with an $(N+1)^{th}$ communication that includes a digest of the $(N+1)^{th}$ message to the first wireless device. The $N^{th}$ message of the second wireless device is meaningless because the $N^{th}$ message was committed to in step S215, when the second wireless device did not know the $N^{th}$ message of the first wireless device that was transmitted in step S210. At this point, either of the wireless device can terminate the communication. Accordingly, in step S245, a determination is made by one or both of the first and second wireless devices whether to terminate the communication. In either of the first wireless device or the second wireless device determines to terminate the communication, operation proceeds to step S320. Otherwise, the communication continues and operation continues to step S250.

In step S250, the first wireless device sends a digest of the second wireless device's $(N+1)^{th}$ communication and the first wireless device's $(N+1)^{th}$ secret to the second wireless device. Next, in step S255 the second wireless device sends a digest of the first wireless device's $(N+1)^{th}$ communication and the second device's $(N+1)^{th}$ secret to the first wireless device. Operation then continues to step S260.

Then in step S260, the first wireless device sends an $(N+1)^{th}$ message which is meaningless, and a digest of its $(N+2)^{th}$ secret that will be used to authenticate its $(N+2)^{th}$ message together with a $(N+2)^{th}$ communication that includes a digest of the $(N+2)^{th}$ message to the second wireless device. The $(N+1)^{th}$ message of the first wireless device is meaningless because it is the second wireless device's turn to send a message which is meaningful. Next, in step S265, the second wireless device sends an $(N+1)^{th}$ message which is meaningful, and a digest of its $(N+2)^{th}$ secret that will be used to authenticate its $(N+2)^{th}$ message together with a $(N+2)^{th}$ communication that includes a digest of the $(N+2)^{th}$ message to the first wireless device. The second wireless device sends the message that is meaningful due to the commitment made in step S240 after the second wireless device learned of the $N^{th}$ message of the first wireless device that was meaningful. Operation then continues to step S270. Accordingly, in step S270, a determination is made by one or both of the first and second wireless devices whether to terminate the communication. In either of the first wireless device or the second wireless device determines to terminate the communication, operation proceeds to step S320. Otherwise, the continues operation and continues to step S275.

In step S275, the first wireless device sends a digest of the second wireless device's $(N+2)^{th}$ communication and the first device's $(N+2)^{th}$ secret to the second wireless device. Next, in step S280, the second wireless device sends a digest of the first wireless device's $(N+2)^{th}$ communication and the second device's $(N+2)^{th}$ secret to the first wireless device. Then, in step S285, the first wireless device sends an $(N+2)^{th}$ message that is meaningless, and a digest of its $(N+3)^{th}$ secret that will be used to authenticate its $(N+3)^{th}$ message together with a $(N+3)^{th}$ communication that includes a digest of the $(N+3)^{th}$ message to the second wireless device. The $(N+2)^{th}$ message is meaningless because the first wireless device was committed in step S260 when the first wireless device had not received the $(N+1)^{th}$ message of the second wireless device that was meaningful. However, the first wireless device can commit to the $(N+3)^{th}$ message that is meaningful because the first wireless device had the $(N+1)^{th}$ message from the second wireless device in step S265 that was meaningful. Operation then continues to step S340S290.

In step S290, the second wireless device sends an $(N+2)^{th}$ message that is meaningless, and a digest of its $(N+3)^{th}$ secret that will be used to authenticate its $(N+3)^{th}$ message together with a $(N+3)^{th}$ communication including a digest of the $(N+3)^{th}$ message to the first wireless device. The $(N+2)^{th}$ message of the second wireless device is meaningless because the next turn to "talk" belongs to the first wireless device. Again, at this point, either of the wireless devices can terminate the communication. Accordingly, in step S295, a determination is made by one or both of the first wireless device and the second wireless device whether to terminate the communication. If either of the first wireless device or the second wireless device determines to terminate the communication, operation jumps to step S320. Otherwise, the communication continues and operation continues to step S300.

In step S300, the first wireless device sends a digest of the second wireless device's $(N+3)^{th}$ communication and the first device's $(N+3)^{th}$ secret to the second wireless device. Next, in step S305, the second wireless device sends a digest of the first wireless device's $(N+3)^{th}$ communication and the second device's $(N+3)^{th}$ secret to the first wireless device. In step S310, the controller N is incremented by 4. Operation then returns to step S235. In contrast, in step S320 operation of the method ends.

It should be appreciated that there are applications for which mutual authentication is not required. For instance, a device designed to provide a service to anyone that requests the service does not need to authenticate the device with which it is communicating, and therefore may be the only one to send pre-authentication information. Such a device may have, for example, a passive beacon such as, for example, an Infra-red (IR) beacon or Radio frequency Identification (RFId) tag, sending pre-authentication information that is sufficient to uniquely and securely identify its active proxy in wireless space. Such an approach may be used to add a measure of security and authentication to systems that use such beacons to provide a "digital presence" for physical objects.

Some of the location-limited channels described with respect to FIG. 4 have broadcast capability. Using such broadcast capabilities, protocols may be constructed that provide for authenticated group communication. Applications can include networked games and meeting support and/or conferencing software.

Audio is a medium that may provide a broadcast location-limited channel. Audio may be monitored and tracked by participants. Even if the participants in the exchange do not know what is carried in the audio messages, they can recognize the legitimate group participants that ought to be sending such audio messages. Audio may be incorporated into sounds that are already used by many pieces of software to provide feedback to participants. For example, most corporate conference call settings play a short "join tone" whenever a new participant enters a call. Such tones may be altered to also contain the participant's key information. Because designated channels designed to carry audio and/or voice information already exists, audio as a location-limited channel may be used via the telephone network.

Because using public key cryptography on location-limited channels means that those exchanges do not require secrecy, and thus are not vulnerable to eavesdropping, the broadcast characteristics of an audio channel may be used to pre-authenticate group communication. Each participant in the group communication broadcasts that participant's pre-authentication information over the audio channel, which is heard by all other legitimate participants. The preauthorization information will generally include a commitment to a public key. The broadcast may also be heard by attackers, but that poses no risk to the protocol's security unless those attackers also managed to broadcast their own pre-authentication information over the audio channel without detection by the legitimate participants, whether by humans or by devices. Any attackers so attempting to broadcast the attacker's information to mount an active attack on the location-limited channel will usually be detected by the legitimate human or device participants, because there will be an "extra" broadcast. For example, in the case of audio, there will be a broadcast from an unexpected location.

Legitimate participants proceed with known or later developed group key exchange protocol, such as those described with respect to FIG. 4, where each participant proves, to one or more legitimate participants, that participant's possession of the private key corresponding to the public key committed to by the participant on the location-limited channel. Any participant capable of proving possession of the private key corresponding to one of the public keys so committed to is considered an authenticated participant in the group communication. Further, the chosen key exchange protocol may also result in all participants sharing a number of additional keys that can be used for encrypting and/or authenticating further communication between the participants of the group communication. Various schemes in constructing an audio channel and applications in wireless network may be found in co-pending provisional application 60/291,521 filed May 15, 2001, which is incorporated herein by reference in its entirety.

Figure 9:
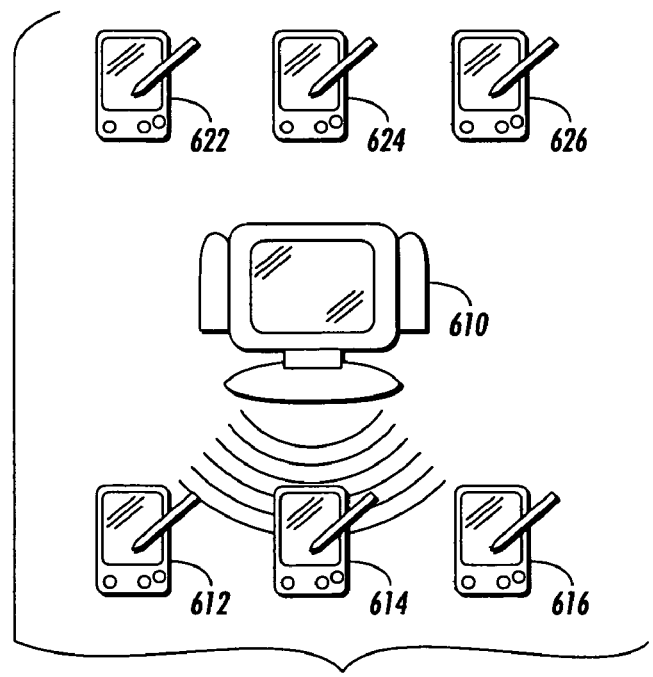
FIGS. 9-11 illustrate an exemplary embodiment of a communication authenticating system for a group of devices according to this invention.
Figure 10:
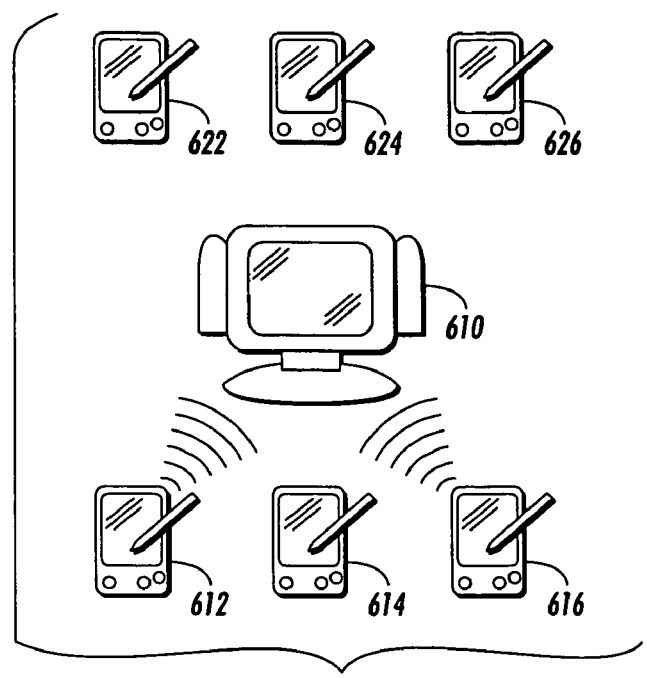
Figure 11:
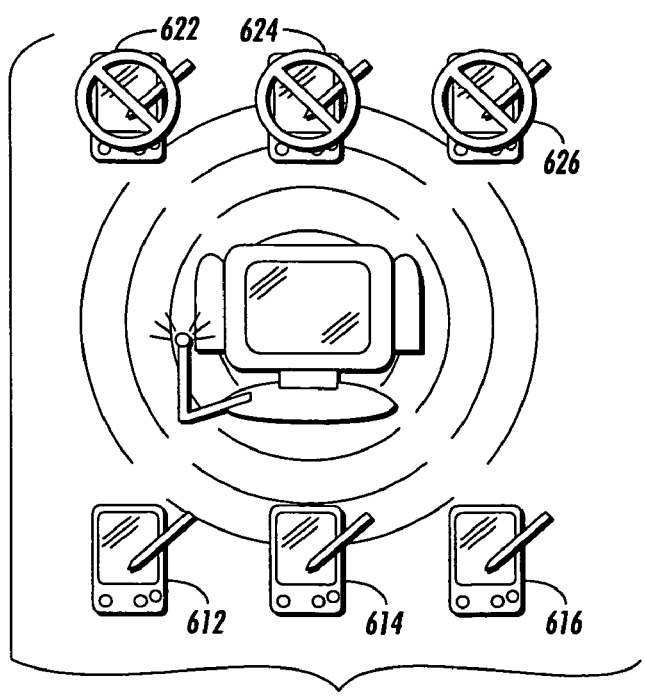

FIGS. 9-11 illustrates an exemplary setting for authenticating a communication over a network medium among a group of wireless devices. As shown in FIG. 9, one participant acts as the group manager 610. In various embodiments, the first participant to send pre-authenticate information becomes the group manager 610. In various other exemplary embodiments, a random participant is selected as the group manager. The group manager 610 broadcasts pre-authentication information, such as a commitment to a group public key, or its own public key, during a pre-authentication stage to various legitimate participants 612, 614 and 616 over a broadcast location-limited channel. As shown in FIG. 10, other parties 622, 624 and 626 are present and have access to the wireless network. In one embodiment, any attempt to send on the location-limited channel results in the detection of the attempt, because the legitimate participants are usually able to detect all transmissions on the location-limited channel, and to are able compare the number of such transmissions with the number of expected transmissions, i.e., the number of legitimate participants. If those numbers do not match, the communication may be terminated.

As shown in FIG. 11, each participant 612, 614 and 616 responds to the pre-authentication broadcast information from the group manager 610 by each broadcasting that participant's own pre-authentication information, each containing a commitment to that participant's own public key, over the location-limited channel. These broadcasts are received by both the group manager 610 and the other legitimate participants 612, 614 and 616. After broadcasting that participant's pre-authentication information, each participant 612, 614, and 616 in turn makes a point-to-point connection to the group manager 610, for example, using the address provided by the group manager 610 as part of the group manager's pre-authentication information. Each participant 612, 614, and 616 engages with the group manager 610 in a point-to-point key exchange protocol, such as, for example Socket Layer/Transport Layer Security (SSL/TLS). Through the point-to-point exchange protocol, the group manager 610 gives each of the participants 612, 614, and 616 a copy of a shared group encryption key or keys. These keys are used to encrypt and authenticate further communication between all the participants, including the group manager 610 and the other participants 612, 614 and 616.

Because the parties 622, 624 and 626 did not broadcast their pre-authentication information on the location-limited channel, the group manager 610 does not recognize the parties 622, 624 and 626 as legitimate participants in the group communication. The parties 622, 624 and 626, therefore, will not be able to successfully create point-to-point connections on the main wireless link with the group manager, 610. This results in the parties 622, 624 and 626 not receiving the shared group key that would allow them to decrypt group communications between the legitimate participants including the group manager 610 and all the other participants 612, 614, and 616.

Figure 12:
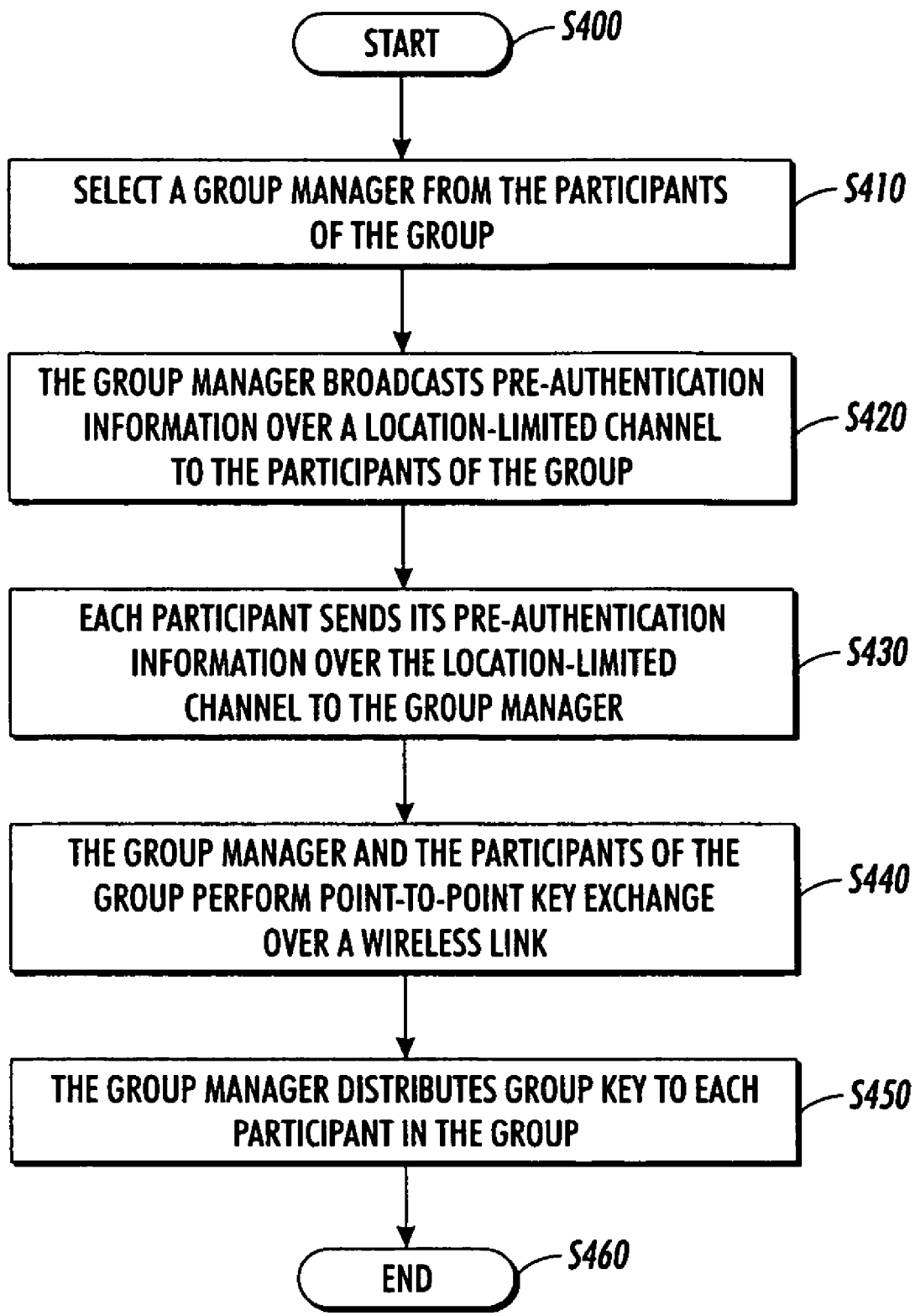
FIG. 12 is a flowchart outlining a third exemplary embodiment of a method for authenticating communication over a wireless medium according to this invention.

FIG. 12 is a flowchart outlining a first exemplary embodiment of a method for authenticating a communication over a network medium among a group of wireless devices. As shown in FIG. 12, the method begins on step S400. Operation continues from step S400 to step S410, where a group manager is selected for participants of the group. Then, in step S420, the group manager broadcasts its pre-authentication information over a location-limited channel to the participants of the group. The pre-authentication information according to one embodiment may be a digest of a public key of the group manager. Next, in step S430, each participant that receives the pre-authentication information of the group manager reciprocates by sending its pre-authentication information to the group manager and the other participants. The exchange of the pre-authentication information between the participants, including the group manager, occurs as a broadcast over the location-limited channel. According to one embodiment, the pre-authentication information of a participant is a digest of a public key of that participant. Operation then continues to step S440.

In step S440, the group manager and each of the participants perform a point-to-point key exchange using the public keys corresponding to the digest of the public keys received during the pre-authentication stage, using any known or later-developed key exchange protocol over the wireless link, for example. Such a protocol will also set up a point-to-point encrypted and authenticated channel between the group manager and the current participants of the group. Next, in step S450, the group manager may distribute to each participant over the wireless link a copy of a group key to be used as a shared session key. Then, in step 460, operation of the authentication method ends, allowing for secure communication among participants of the group, including the group manager, to proceed.

In a centrally-managed group, managing the joining and leaving of participants may be relatively easy. In various exemplary embodiments, a joining participant may use one of the two-party protocols discussed above with the group manager 610 to authenticate itself, and to receive the group key over a secured wireless link. When a participant leaves a group, the group manager 610 can distribute a new group key to all remaining participants over the wireless link. This may be done because the group manager 610 has established shared secret keys with each individual participant of the group during the point-to-point key exchange.

Figure 13:
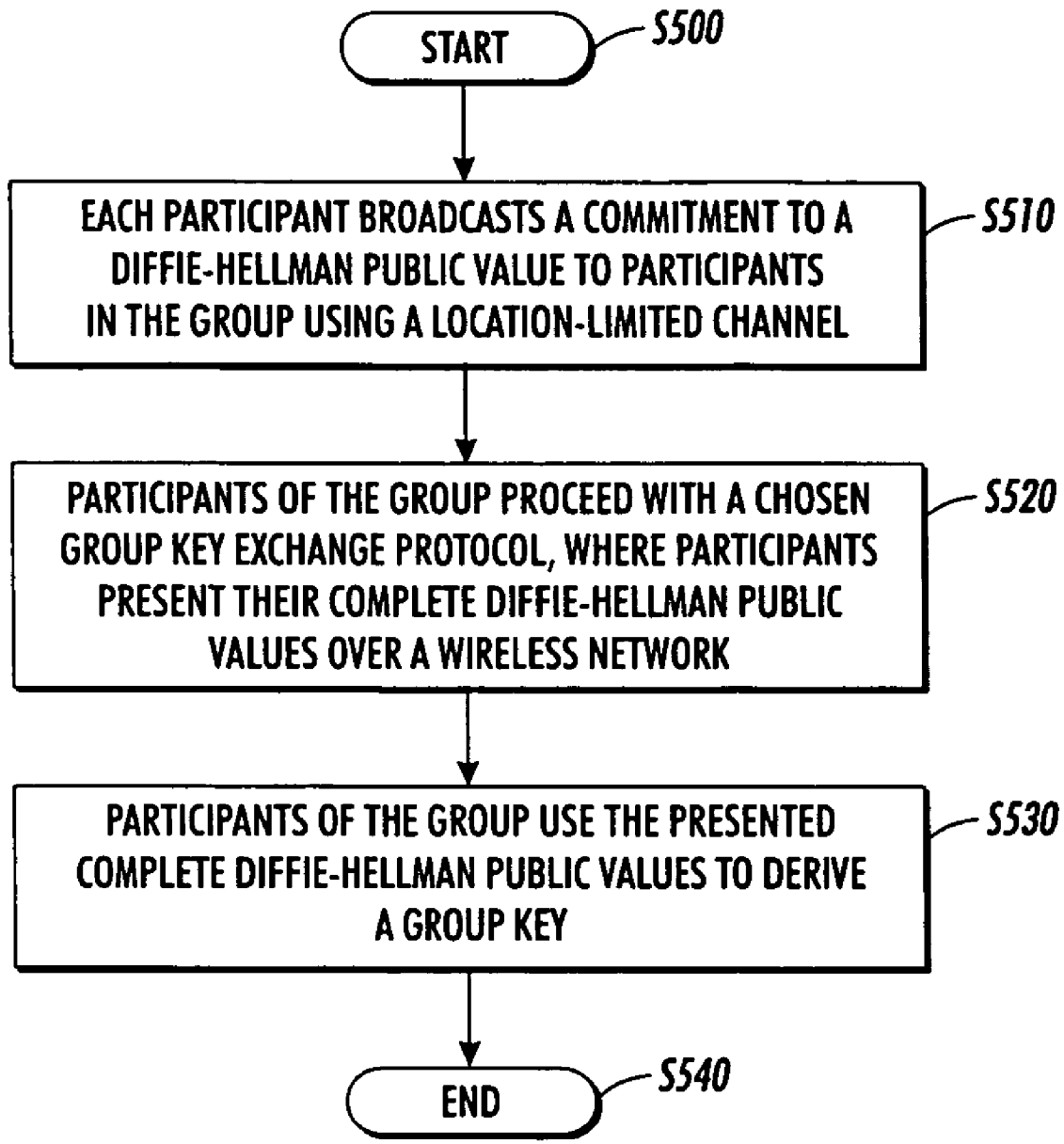
FIG. 13 is a flowchart outlining a fourth exemplary embodiment of a method for authenticating communication over a wireless medium according to this invention.

FIG. 13 is a flowchart outlining a second exemplary embodiments of the method for authenticating a communication over a network medium among a group of wireless devices. The method outlined in FIG. 11 allows all participants to equally participate in key generation, and thus all participants may be equally trusted.

As shown in FIG. 13, operation of the method begins in step S500 and continues to step S510, where each participant broadcasts its pre-authentication information, such as a commitment to a Diffie-Hellman public value, to the participants of the group using a broadcast location-limited channel. Then, in step S520, each participant proceed with a chosen group key exchange protocol, where participants present their complete Diffie-Hellman public values over a wireless network. In various exemplary embodiments, the group key exchange protocol may be a modified Diffie-Hellman key exchange among participants of the group, which allows all participants to share in the generation of the group shared secret key.

An example of the Diffie-Hellman key exchange is described in M. Just et al., "Authenticated Multi-party Key Agreement", Advances in Cryptology, ASIACRYPT '96, Lecture Notes in Computer Science, Berlin, 1996, Springer-Verlag and Y. Kim et al., "Simple and Fault-tolerant Key Agreement for Dynamic Collaborative Groups", In S. Jajodin et al., editors, 7$^{th}$ ACM Conference on Computer and Communications Security, pages 235-241, each of which is incorporated herein by reference in its entirety. However, like the standard two-party Diffie-Hellman key exchange, while a secret may be established, the participants of the group are strangers. Thus, these protocols based on extending Diffie-Hellman assume that all participants participate in a shared public key infrastructure, or have previously exchanged public keys.

In various exemplary embodiments, because pre-authentication information exchanged over the location-limited channels allows the participants to authenticate each other, this assumption is no longer necessary. The use of a broadcast location-limited channel allows all participants of the group to commit to their public keys publicly to one or more participants of the group. Next, in step S530, the participants may then proceed with the chosen group key exchange protocol over the wireless link and, for example, use the presented complete Diffie-Hellman public values to derive a group key. Operation then continues to step S540, where operation of the authentication method ends, allowing secure communication to proceed.

A participant who joins in after a session has started may broadcast that participant's key commitment over the location-limited channel to the rest of the participants of the group as that participant joins. A randomly selected current participant can respond, providing mutual authentication. The chosen group key exchange protocol is used to handle the details of updating the shared group key for these new participants, or revoking keys of departing participants.

As described above, the systems and methods according to this invention allow at least two devices to be authenticated over a network medium. The systems and methods according to this invention allow the medium used for the location-limited channel, the public key algorithm used for the key commitments, and/or the final authenticated key exchange protocol used over the wireless link to be dynamically chosen.

In various exemplary embodiments, a software framework that supports inclusion of different location-limited channel types, public key algorithms used for the key exchange protocols and the final key exchange protocols chosen, and allows these to be dynamically chosen, can be used. The framework can be extended, to provide a new location-limited channel type, or a new key exchange protocol for example, by implementing a Java™ interface to provide a small amount of syntactic "glue".

The framework provides both client and server components, and allows developers to choose from either low-level, step-by-step control over data exchange, or to use simpler, higher-level interfaces. Such interfaces, for instance, provide server threads that can manage pre-authentication of multiple clients over the location-limited channel, and offer control over how such pre-authentication information is used to authenticate those clients over the wireless link. Framework components maintain state tracking regarding which devices have currently pre-authenticated, what keying information is currently in use by a particular device, and the like.

In various exemplary embodiments, a system comprises a client, which is the initiator of the authenticated channel, and a responding server. The server listens for a connection on both the location-limited channel and the primary link, but only admits primary-link connections from clients who have performed pre-authentication on the location-limited channel.

In various exemplary embodiments, the commercially-available Infra-red Data Association (IrDA) system can be used as a medium for the location-limited channel. The client opens an IrDA connection to the server, and generates an error if it discovers more than one potential IrDA endpoint. Across this connection, the client and the server exchange pre-authentication data such as, for example, XML-encoded pre-authentication data, containing pre-authentication information, such as, for example, a commitment to an ephemeral Digital Signature Algorithm (DSA) public key, a "friendly name", and an IP address and a port on which the server is listening.

With the pre-authentication complete, the IR channel is closed, and the client extracts the server's IP address and port number from the data it received. The client opens a normal SSL/TLS connection to the server on the primary link. Each side uses the information gained in the pre-authentication step, i.e., the commitments to the public keys, to authenticate the newly opened channel. The client and server are now free to securely exchange any information they choose over the primary link.

While the invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of the invention.

What is claimed is:

1. A method for securing communication over a network medium between at least two devices including a first device and a second device, comprising:
   receiving over a location limited communication channel, by the second device, public authentication information transmitted by said first device, wherein the location limited communication channel has physical limitations which allow the second device to identify the first device communicating across the channel based on the limited locations accessible to the location-limited channel, thereby causing said location limited communication channel to be difficult to actively attack without detection, and wherein said public authentication information comprises a commitment to secret information;
   receiving a communication from said first device over said network medium, the communication comprising the secret information;
   authenticating said communication at said second device by determining that the commitment corresponds to the received secret information, thereby authenticating that said first device actually possesses said secret information; and
   in response to authenticating the communication at the second device, sending a communication over the network medium to the first device, the communication comprising a commitment to new secret information that will be used to authenticate a subsequent message from the second device.

2. The method of claim 1, wherein said public authentication information is a one-way function of an authenticator.

3. The method of claim 1, wherein said public authentication information is a public key or a one-way function of said public key.

4. The method of claim 1, wherein said public authentication information is a one-way function of said secret information known to said first device.

5. The method of claim 1, wherein authenticating said communication uses a key exchange protocol over said network medium.

6. The method of claim 1, wherein said location limited communication channel is an infra-red channel.

7. The method of claim 1, wherein said location limited communication channel is an audio channel.

8. A method for securing a communication over a network medium between a group of devices, each of said group of devices associated with its own public authentication information, the method comprising designating a group manager from said group of devices wherein said group of devices includes said group manager and a plurality of other devices, said plurality of other devices comprising a first device and a second device; performing a key exchange protocol by said group manager, said key exchange protocol being dependent on an established trust relationship between said group of devices; and securing said communication over said network medium; wherein the improvement comprises:
   sending, by said group manager over a location limited communication channel, public authentication information associated with said group manager to said first device and said second device, wherein said public authentication information comprises a commitment to group manager secret information, wherein the location limited communication channel has physical limitations which allow the group manager to identify the first and second devices communicating across the channel based on the limited locations accessible to the location-limited channel, thereby causing said location limited communication channel to be difficult to actively attack without detection;
   receiving, by said group manager over said location limited communication channel, public authentication information associated with said first device, and public authentication information associated with said second device; wherein said public authentication information associated with said first device comprises a commitment to first device secret information and wherein said public authentication information associated with said second device comprises a commitment to second device secret information, whereby sending and receiving over said location limited communication channel establishes said established trust relationship;
   receiving, by the group manager over the network medium, a communication from the first device and a communication from the second device, wherein the communication from the first device comprises the first device secret information, and wherein the communication from the second device comprises the second device secret information;
   attempting to authenticate, by said group manager each of said plurality of other devices; the attempting to authenticate by said group manager comprising determining that the commitment received from the first device corresponds to the first device secret information, and determining that the commitment received from the second device corresponds to the second device secret information, thereby authenticating that said first device actually possesses said first device secret information and that said second device actually possesses said second device secret information;
   in response to authenticating the communication at the group manager, sending a communication over the network medium to the first device and the second device, the communication comprising a commitment to new secret information that will be used to authenticate a subsequent message from the group manager;
   receiving, by the first device and the second device over the network medium, a communication from the group manager, wherein the communication from the group manager comprises the group manager secret information; and
   attempting to authenticate, by each of said plurality of other devices, said group manager; the attempting to authenticate by each of said plurality of other devices comprising said first device and the second device determining that the commitment received from the group manager corresponds to the group manager secret information, thereby authenticating that said group manager actually possesses said group manager secret information.

9. The method of claim 8, further comprising distributing, by said group manager, group key information over said network medium to said plurality of other devices.

10. The method of claim 8, further comprising:
receiving a new device into said group of devices;
sending, by said group manager over said location limited communication channel, said public authentication information associated with said group manager to said new device;
receiving, by said group manager over said location limited communication channel, public authentication information associated with said new device; wherein said public authentication information associated with said new device commits said new device to possession of new device secret information; and
attempting to authenticate, by said group manager, said new device, the attempt comprising requesting said new device to authenticate that said new device actually possesses said new device secret information whereby said new device is included in said established trust relationship.

11. The method of claim 9, wherein the group of devices includes a third device, and wherein the method further comprises:
detecting when said third device leaves said group of devices; and
using said network medium to distribute a new group key information from said group manager to said plurality of other devices remaining in said group of devices.

12. A method of authenticating a communication over a network medium among a group of devices including a first device and a second device, the method comprising performing a key exchange protocol between said group of devices, said key exchange protocol being dependent on an established trust relationship between said group of devices, and securing said communication over said network medium, wherein the improvement comprises:
sending, by each of said group of devices over a location limited communication channel, public authentication information associated with said each of said group of devices to every other of said group of devices, wherein said public authentication information associated with said each of said group of devices comprises a commitment to secret information corresponding thereto, wherein the location limited communication channel has physical limitations which allow each of the group of devices to identify every other of the group of devices communicating across the channel based on the limited locations accessible to the location-limited channel, thereby causing said location limited communication channel to be difficult to actively attack without detection;
receiving, by said each of said group of devices over said location limited communication channel, said public authentication information associated with said each of said group of devices from every other of said group of devices, whereby sending and receiving over said location limited communication channel establishes said established trust relationship;
receiving, by each of the group of devices over the location limited communication channel, a communication from every other of the group of devices, wherein the communication received from every other of the group of devices comprises the secret information corresponding thereto;
attempting to authenticate, by said each of said group of devices determining that commitment received from every other of the group of devices corresponds to the received secret information corresponding thereto, thereby authenticating that every other of said group of devices possesses respective secret information thereof; and
in response to authenticating the communication at a respective device of the group of devices, sending a communication over the network medium to every other of the group of devices, the communication comprising a commitment to new secret information that will be used to authenticate a subsequent message from the respective device.

13. The method claim 12, wherein said group key exchange protocol is a Diffie-Hellman key exchange protocol.

14. A system for securing a communication over a network medium, the system comprising:
a first device and a second device, wherein
the second device receives, over a location limited communication channel public authentication information transmitted by said first device, wherein the location limited communication channel has physical limitations which allow the second device to identify the first device communicating across the channel based on the limited locations accessible to the location-limited channel, thereby causing said location limited communication channel to be difficult to actively attack without detection, and wherein said public authentication information comprises a commitment to secret information,
the second device receives a communication from said first device over said network medium, the communication comprising the secret information;
the second device authenticates the communication by determining that the commitment corresponds to the received secret information, thereby authenticating that said first device actually possesses said secret information; and
in response to authenticating the communication at the second device, the second device sends a communication over the network medium to the first device, the communication comprising a commitment to new secret information that will be used to authenticate a subsequent message from the second device.

15. The system of claim 14, further comprising:
a memory that stores an authentication application used by a processor to authenticate the communication.

16. The system of claim 14, wherein the first device includes a infra-red receiver/transmitter.

17. The system of claim 14, wherein the first device includes an audio receiver/transmitter.

18. The system of claim 14, wherein the second device authenticates the communication using a public-key-based key exchange protocol.

19. A method for securing communication over a network medium between at least two devices including a first device and a second device, comprising:
transmitting, from said first device, public authentication information over a location limited communication channel, wherein the location limited communication channel has physical limitations which allow the second device to identify the first device communicating across the channel based on the limited locations accessible to the location-limited channel, thereby causing said location limited communication channel to be difficult to actively attack without detection, and wherein said public authentication information comprises a commitment to secret information;
transmitting a communication from said first device to said second device over said network medium, the communication comprising the secret information;

demonstrating to said second device that said first device actually possesses said secret information by demonstrating that the commitment corresponds to the secret information; and receiving at the first device a communication over the network medium from the second device, the communication comprising a commitment to new secret information that will be used to authenticate a subsequent message from the second device.

20. The method claim 1, the method further comprising:

receiving over said location limited communication channel, by the first device, a second public authentication information transmitted by said second device, wherein said second public authentication information commits said second device to possession of a second secret information;

receiving a second communication from said second device over said network medium; and authenticating said second communication at said first device wherein said first device requires said second device to authenticate to said first device that said second device actually possesses said second secret information.

* * * * *